United States Patent
Park et al.

(10) Patent No.: US 7,477,709 B2
(45) Date of Patent: Jan. 13, 2009

(54) DEVICE AND METHOD FOR DATA REPRODUCTION

(75) Inventors: Hyun-soo Park, Seoul (KR); Jae-seong Shim, Seoul (KR); Jae-wook Lee, Gyeonggi-do (KR); Jung-hyun Lee, Seoul (KR); Eun-jin Ryu, Gyeonggi-do (KR); Eing-seob Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 593 days.

(21) Appl. No.: 10/910,422

(22) Filed: Aug. 4, 2004

(65) Prior Publication Data

US 2005/0058048 A1 Mar. 17, 2005

(30) Foreign Application Priority Data

Sep. 16, 2003 (KR) .................... 10-2003-0064231

(51) Int. Cl.
*H03D 1/00* (2006.01)
(52) U.S. Cl. .................... 375/341; 369/100; 704/242; 714/795
(58) Field of Classification Search ............ 341/94; 360/51; 369/30.12, 47.18, 47.27, 59.15, 369/59.22, 341
See application file for complete search history.

(56) References Cited

U.S. PATENT DOCUMENTS

| | | | | | |
|---|---|---|---|---|---|
| 5,450,389 | A | * | 9/1995 | Hayashi | 369/59.15 |
| 5,654,948 | A | * | 8/1997 | Tobita | 369/30.12 |
| 5,901,128 | A | * | 5/1999 | Hayashi et al. | 369/59.22 |
| 5,963,518 | A | * | 10/1999 | Kobayashi et al. | 369/47.27 |
| 6,307,822 | B1 | | 10/2001 | Shim et al. | |
| 6,373,413 | B1 | * | 4/2002 | Yoshinaka | 341/94 |
| 2001/0016002 | A1 | | 8/2001 | Shim et al. | |
| 2002/0060596 | A1 | | 5/2002 | Shim et al. | |
| 2002/0071194 | A1 | * | 6/2002 | Honma | 360/51 |

FOREIGN PATENT DOCUMENTS

| | | |
|---|---|---|
| KR | 2000-32909 | 6/2000 |
| KR | 2001-68846 | 7/2001 |
| KR | 2002-24411 | 3/2002 |

OTHER PUBLICATIONS

Widrow and Stearns; Adaptive Signal Processing; 1985; Prentice Hall; pp. 99-103.*

* cited by examiner

*Primary Examiner*—Kevin M Burd
*Assistant Examiner*—Adolf Dsouza
(74) *Attorney, Agent, or Firm*—Stein, McEwen & Bui, LLP

(57) ABSTRACT

A device and method of data reproduction that can achieve a reference level optimizing the characteristic of a channel and can be applied to the reproduction of data on an optical disk are provided. According to the device and method, even when an input signal is in an abnormal state, an input level value can be initialized so that a Viterbi decoder can normally operate.

24 Claims, 7 Drawing Sheets

DEVICE AND METHOD FOR DATA REPRODUCTION

CROSS-REFERENCE TO RELATED APPLICATIONS

This application claims the priority of Korean Patent Application No. 2003-64231, filed on Sep. 16, 2003 in the Korean Intellectual Property Office, the disclosure of which is incorporated herein by reference.

BACKGROUND OF THE INVENTION

1. Field of the Invention

The present invention relates to a data reproduction device and method using viterbi decoding, and more particularly, to a data reproduction device and method that can achieve a reference level optimizing the characteristic of a channel and can be applied to the reproduction of data on an optical disk.

2. Description of the Related Art

In an optical disk, a binary signal is recorded on the surface of the disk and by reading a reflected waveform when a laser beam is applied to the surface of the disk, the original binary signal is reproduced. At this time, the signal read from the surface of the disk is referred to as a radio frequency (RF) signal. The RF signal has a characteristic of an analog signal due to the physical and optical characteristic of the disk. Accordingly, the analog signal should be converted into a digital signal and this conversion necessarily needs binarization and a phase locked loop (PLL) process. A variety of binarization means are available, and among them a viterbi decoder is known as a decoding apparatus capable of obtaining a binary signal having the least errors. Also, the viterbi decoder is known to be capable of obtaining a binary signal in an optimal condition to suit the characteristic of a channel and to have a better performance than that of a simple sign detection circuit or a run length correction method.

FIG. 1 is a block diagram of a conventional art data reproduction apparatus having a vterbi decoder. An analog signal 101 read from an optical disk (not shown) is converted into a quantized digital signal 102, by being sampled and held by an analog-to-digital converter 110. An offset cancellation unit 120 compensates the DC component of the quantized digital signal 102 using an offset signal 103. An equalizer is usually implemented by a finite impulse response (FIR) filter 130 and amplifies each input signal 104, which is the digital signal 102 compensates by the offset signal 103, that is delayed and then input, in a predetermined frequency band so that the characteristic of a channel becomes clear. Since a branch metric generator (not shown) inside a viterbi decoder 140 generates a state metric by obtaining the difference between each reference level and an actual input signal 105, a reference level 107 input to the viterbi decoder 140 has a great influence on the performance of the viterbi decoder 140. However, due to the physical characteristic of a disk and situational changes, a reference level 107 having an optimal condition for a signal input 105 from each medium is different, and a reference level 107 maximizing the performance of the viterbi decoder 140, should be determined.

One method to solve the above problem is to add a level detector 150 to the apparatus, as shown in FIG. 1. This method or device is disclosed in detail in Korean Patent No. 2000-00965. The level detector 150 generates an optimum reference level 107 which is input to the viterbi decoder 140 from the output 105 of the FIR filter 130. The level detector 150 determines one of reference levels 107 used in the viterbi decoder 140, including +/− maximum level, +/− medium level, and zero level, by monitoring the output 105 of the equalizer 130. Then, by using the determined value as a determined level of the viterbi decoder 140, the error ratio of data bits is reduced and the data detection 106 performance is improved. Each of the components 110, 120, 130, 140, 150 receives a signal 109 from a phase locked loop unit 160, which phase loop locks the input signal 104.

However, in the conventional data reproduction device in FIG. 1, an optimum reference level is selected by selecting a signal 107 having a predetermined level, such as +/− maximum level and +/− medium level. Accordingly, if noise occurs in a determined level, this level 107 does not correspond to the original reference level, but to another level, causing serious problems in the decoding procedure. Generally, the higher the recording density of an optical disk, the lower the quality of a signal 106 reproduced. Generally, tangential tilt or radial tilt caused by deformation of a disk substrate or a pickup apparatus creates noise in this high recording density disk, and the increasing error ratio due to this noise causes more serious problems in an ordinary disk reproduction device.

SUMMARY OF THE INVENTION

The present invention provides a device and method for data reproduction by which even when an input signal is in an abnormal state, an input level value can be initialized so that a viterbi decoder can normally operate.

According to an aspect of the present invention, there is provided an apparatus for detecting a level value of a viterbi decoder, including a viterbi decoder; a binarization unit which generates a binary signal from an input RF signal; and a channel identifier which detects a reference level value of the viterbi decoder based on the input RF signal and the binary signal, wherein the channel identifier selects a level of the input RF signal based on the binary signal, and by obtaining a mean value of the input RF signal of the level and the previous reference level value, detects the reference level value. The binarization unit is a slicer, or the binarization unit additionally has a run length compensator.

According to an aspect of the present invention, the channel identifier includes a selection signal generator which generates a selection signal based on the binary signal; a level selector which selects a level type to be detected from the input RF signal according to the selection signal; and a mean filter which generates a new level value based on a previous level value and the level value of the input signal input as the selected level type.

According to another aspect of the present invention, there is provided a data reproduction device including a viterbi decoder which generates a first binary signal from an input RF signal; a binarization unit which generates a second binary signal form the input RF signal; and a channel identifier which selects a level of the input RF signal and by obtaining the mean value of the input RF signal of the level and the previous reference level value, detects the reference level value of the viterbi decoder, wherein the channel identifier selects a level of the input RF signal by selectively using the first and second binary signals.

According to another aspect of the present invention, the channel identifier includes a selection signal generator which generates a selection signal based on the binary signal; a level selector which selects a level type to be detected from the input RF signal according to the selection signal; and a mean filter which generates a new level value based on a previous level value and the level value of the input signal input as the selected level type.

According to another aspect of the invention, the channel identifier further includes a first selector which based on a binarization unit selection signal from a control unit, selects any one of the first binary signal (BD1) or the second binary signal (BD2), and provides the selected signal to the selection signal generator; and a second selector which based on the binarization unit selection signal, selects any one of a signal obtained by delaying the input RF signal m times and a signal obtained by delaying the input RF signal n times, and provides the selected signal to the level selector, wherein m denotes a delay time by the operation of the viterbi decoder, and n denotes the delay time by the operation of the slicer.

According to still another aspect of the present invention, there is provided a data reproduction device having a viterbi decoder including a binarization unit which generates a binary signal from an input RF signal; and a channel identifier which detects a reference level value of the viterbi decoder based on the input RF signal and the binary signal, wherein when an abnormal state signal is received, the channel identifier detects a predetermined initialization level value as a reference level value of the viterbi decoder.

According to another aspect of the invention, the data reproduction device further includes a control unit which receives the abnormal state signal and transmits the initialization level value to the channel identifier. The data reproduction device can further comprise a memory unit which stores the initialization level value.

According to another aspect of the invention, the channel identifier includes a selection signal generator which generates a selection signal based on the binary signal; a level selector which selects a level type to be detected from the input RF signal according to the selection signal; and a mean filter which generates a new level value based on a previous level value and the level value of the input signal input as the selected level type.

According to another aspect of the invention, the predetermined initialization level value can be a reference level value which, when the output binary signal (BD1) of the viterbi decoder is a normal signal, is generated by the channel identifier and stored in the memory unit. The predetermined initialization value can be a reference level value which is detected based on a binary signal from a binarization unit that is not a viterbi decoder.

According to another aspect of the invention, if the abnormal state signal is inactivated, the channel identifier can generate a reference level value based on an output binary signal of the viterbi decoder.

According to another aspect of the invention, the channel identifier can further includes a first selector which based on a binarization unit selection signal from a control unit, selects any one of an output binary signal (BD1) of the viterbi decoder and an output binary signal (BD2) of the slicer, and provides the selected signal to the selection signal generator; and a second selector which based on the binarization unit selection signal, selects any one of a signal obtained by delaying the input RF signal m times and a signal obtained by delaying the input RF signal n times, and provides the selected signal to the level selector, wherein m denotes a delay time by the operation of the viterbi decoder, and n denotes the delay time by the operation of the slicer.

According to another aspect of the invention, the binarization unit selection signal can be generated by the control unit when a user input or the abnormal state signal is received.

According to another aspect of the invention, the abnormal state signal can be any one of a signal which is generated when no signal is input in the initial stage of driving a disk, a signal which is generated by a defect detection method for checking defection of an envelope signal waveform of the input RF signal itself, and a signal which is generated by a size checking method for checking whether or not the size of a waveform obtained by subtracting a minimum value from a maximum value in reference level values detected by the channel identifier, is equal to or less than a predetermined threshold value.

According to yet still another aspect of the present invention, there is provided a data reproduction method for detecting a level value of a viterbi decoder. The method includes viterbi decoding; generating a binary signal from an input RF signal; and detecting a reference level value of the viterbi decoder based on the input RF signal and the binary signal in identifying a channel, wherein the identifying a channel includes: selecting a level of the input RF signal based on the binary signal, and by obtaining a mean value of the input RF signal of the level and the previous reference level value, detecting the reference level value.

According to a further aspect of the present invention, there is provided a data reproduction method using a viterbi decoder. The method includes generating a binary signal from an input RF signal; and detecting a reference level value of the viterbi decoder based on the input RF signal and the binary signal in identifying a channel, wherein the identifying a channel includes: when an abnormal state signal is received, detecting a predetermined initialization level value as a reference level value of the viterbi decoder.

According to another aspect of the invention, the data reproduction method further includes receiving the abnormal state signal and transmitting the initialization level value to the channel identifier in transmitting an initialization level value. The data reproduction method further includes storing the initialization level value in a memory.

Additional aspects and/or advantages of the invention will be set forth in part in the description which follows and, in part, will be obvious from the description, or may be learned by practice of the invention.

BRIEF DESCRIPTION OF THE DRAWINGS

Reference will now be made in detail to the embodiments of the present invention, examples of which are illustrated in the accompanying drawings, wherein like reference numerals refer to the like elements throughout. The embodiments are described below to explain the present invention by referring to the figures.

DETAILED DESCRIPTION OF THE EMBODIMENTS

Figure 1:
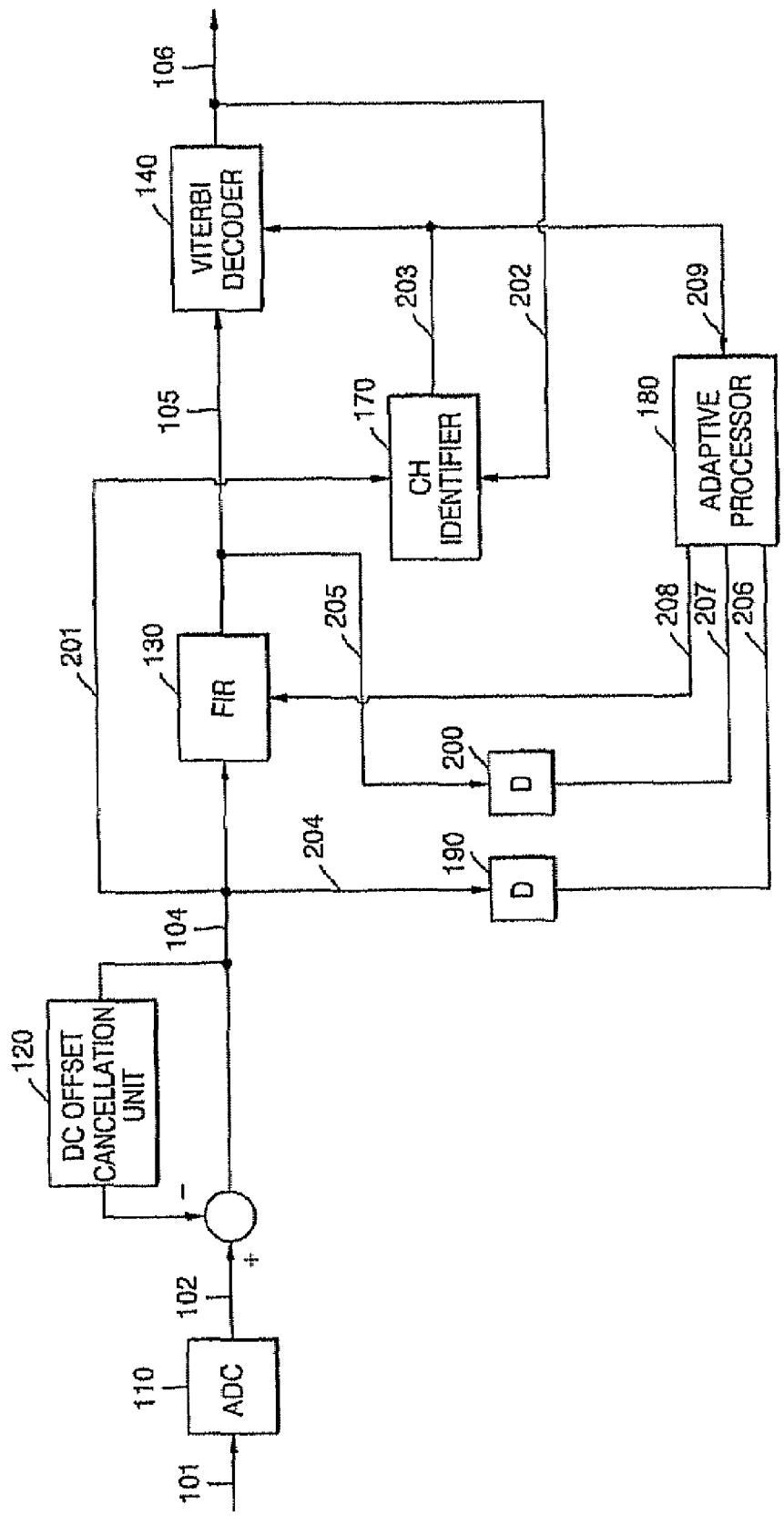
FIG. 1 is a block diagram of a conventional data reproduction apparatus having a viterbi decoder.

Reference-will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which exemplary embodiments of the invention are shown.

Figure 2A:
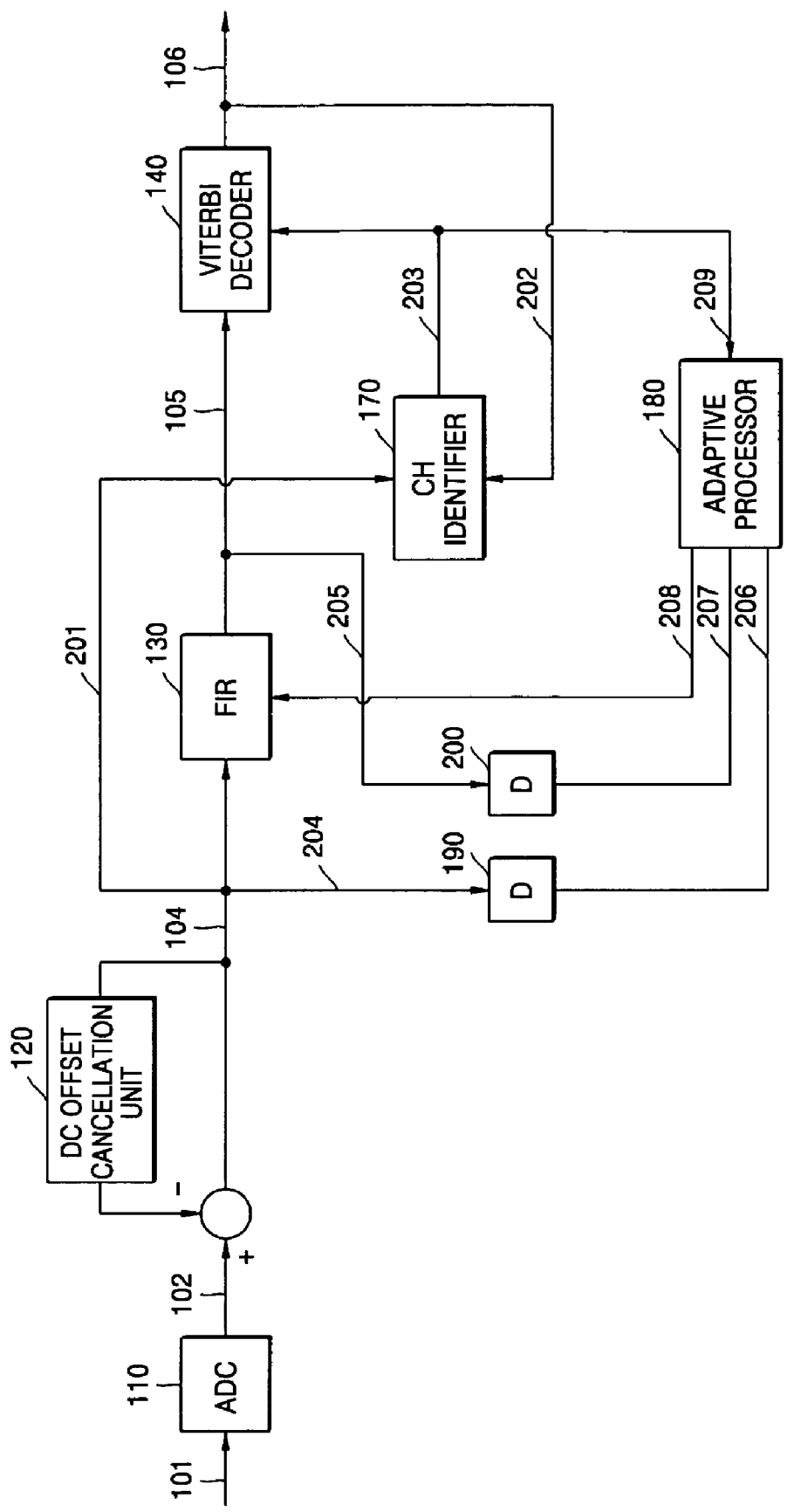
FIG. 2A is a block diagram of a data reproduction apparatus having a viterbi decoder.

FIG. 2A is a block diagram of the data reproduction apparatus having a viterbi decoder.

An analog signal 101 read from an optical disk is converted into a quantized digital signal 102, by being sampled and held by an analog-to-digital converter 110. The DC component of the quantized digital signal 102 is compensated optimally by an offset cancellation unit 120. An equalizer 130 is usually implemented by a finite impulse response (FIR) filter and delays and amplifies each input signal in a predetermined frequency band so that the characteristic of a channel becomes specific. Since a branch metric generator (not shown) inside a viterbi decoder 140 generates state metric by obtaining the difference between each reference level and an actual input signal, a reference level input to the viterbi decoder 140 has a great influence on the performance of the viterbi decoder 140. However, due to the physical characteristics of a disk and situational changes, a reference level having an optimal condition for a signal input from each medium is different and changes as time goes by. Therefore an optimum reference level, that is, a reference level maximizing the performance of the viterbi decoder 140, should be determined here.

A channel identifier 170 and an adaptation processor 180, characterize the technology of the conventional art mentioned above. The inputs of the channel identifier 170 are the input signal 104 (201) of the equalizer 130 and the output signal 106 (202) of the viterbi decoder 140. in order to generate an estimated level value 203, the input signal 104 (201) of the equalizer 130, instead of the output signal 105 of the equalizer 130, is used so that the reproduction error by tilt can be reduced when data on the optical disk is reproduced. Also, the channel identifier 170 is used to estimate the level of the output signal of the viterbi decoder 140. This is to generate a selection signal to determine an object of estimation. The adaptation processor 180 has as inputs an estimated level value 203 (209), that is the output signal of the channel identifier 170, and the input signal 204 (206) and the output signal 205 (207) of the equalizer 130. The adaptation processor 180 generates an updated coefficient 208 for the equalizer 130.

Figure 2B:
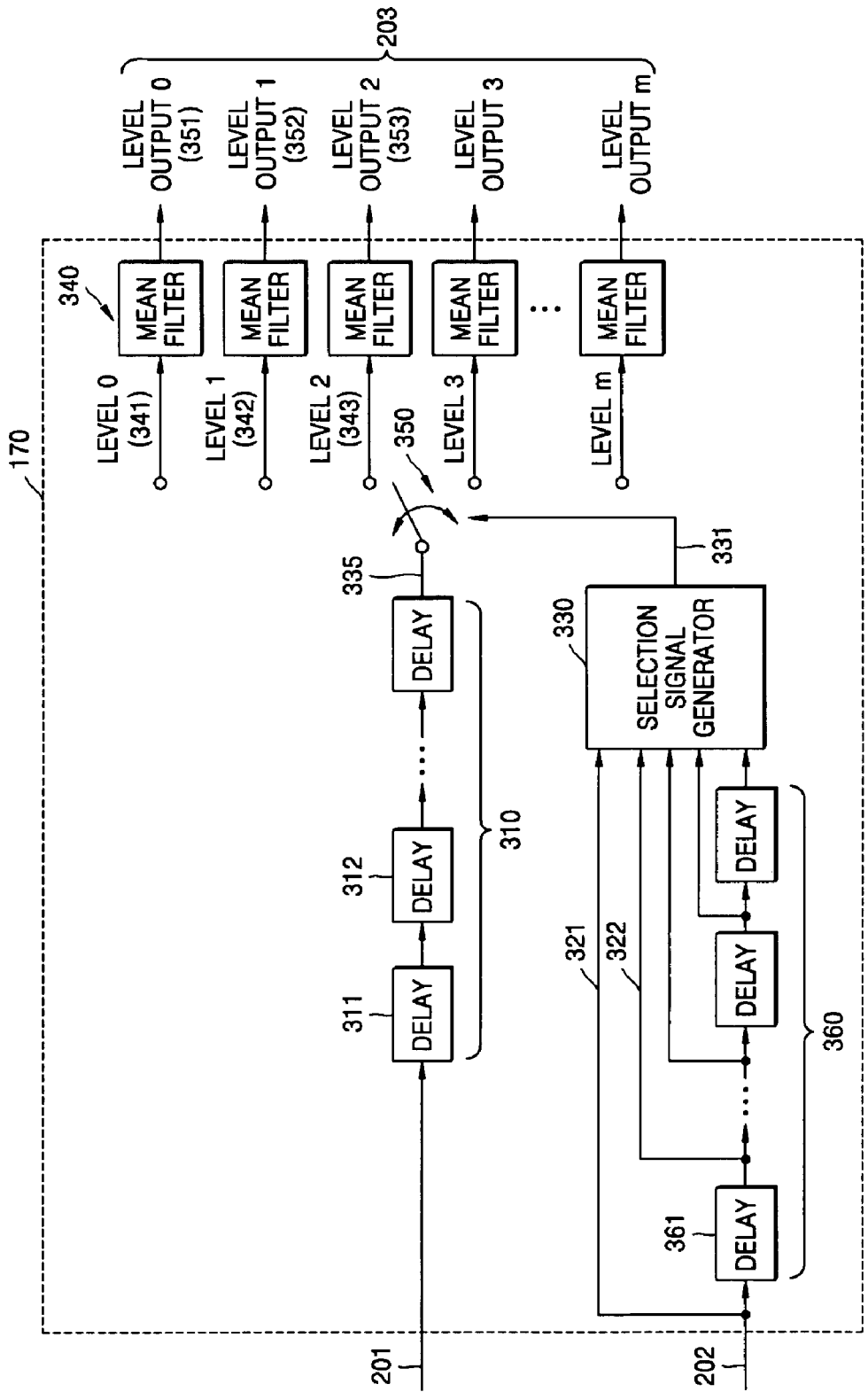
FIG. 2B is a diagram showing the internal structure of a channel identifier of FIG. 2A.

FIG. 2B is a diagram showing the internal structure of a channel identifier.

The channel identifier 170 includes a selection signal generator 330, a level selector 350, and a mean filter 340. The selection signal generator 330 receives the output signal 202 of a viterbi decoder and generates a selection signal 331. At this time, the output signal of the viterbi decoder 140 is a binary signal having any one value of 0 and 1, and is a final output decoded by the viterbi decoder 140. According to the operation principle of the viterbi decoder 140, the output signal of the viterbi decoder 140 is related to the input signal of the viterbi decoder 140, that is, the output signal of the equalizer, and this means that the output signal of the viterbi decoder 140 can determine the type of a level input to the viterbi decoder 140. An example will now be explained. When a signal level is generated by PR (1,2,1) and the code type is (1,7), idealistic level values that can occur are 4, 2, −2, −4. If the levels of an input signal are 4, 4, 4, 2, −2, −4, −4, −4, −2, 2, . . . , the output signals of the decoder will be 1, 1, 1, −1, −1, −1, −1, −1, 1, 1, . . . At this time, if the same number of output signals of the viterbi decoder 140 as the number of taps of the viterbi decoder 140 are multiplexed, the outputs will be 111, 11−1, 1−1−1, −1−1−1, . . . , and if represented in a binary signal, the outputs will be 111, 110, 100, 000, . . . Accordingly, these binary signals indicate that 4, 2, −2, −4, . . . , are input, respectively, such that 111, 110, 100, 000, . . . , can be used as selection signals to determine the type of the level value such as 4, 2, −2, −4, . . .

The output signal 202 of the viterbi decoder 140 input to the channel identifier 170 is delayed by the same number of delay units 361, . . . , as the number of the taps of the viterbi decoder −1, divided, and input to the selection signal generator 330. The delayed input signals 321, 322, . . . , are combined by the selection signal generator 330 to generate a selection signal 331 in the form of a binary signal. For example, when the number of taps of the viterbi decoder 140 is 3, the number of delays is 2, then the forms of selection signal include 111, 110, 100, 000, . . . The reason for using the delays 361, . . . , is that the output of the viterbi decoder 140 is not immediately output. That is, the output of the viterbi decoder 140 is output after predetermined system clocks for operation, and therefore, in order to select an input signal corresponding to the output signal of the viterbi decoder 140, the delay time corresponding to the operation should also be allocated to the input signal 202 of the channel identifier 170.

Also, the selection signal 331 can be removed when it corresponds to a viterbi path that is removable according to the condition of a shortest signal. For example, in the case of a 3-tap structure viterbi decoder using (1,7) code, selection signals 331 of 010 and 101 corresponding to 1T are removed and therefore 6 selection signals, including 000, 001, 01, 100, 1110, and 111, are available. Likewise, in the case of a 5-tap structure viterbi decoder using (1,7) code, only 16 levels are needed and the number of selection signals that are generated is also 16. If the output of the viterbi decoder operates normally, 1T signal is not generated in the output signal of the viterbi decoder and therefore an additional structure for generation of a selection signal is not needed.

Another input signal of the channel identifier 170 is the input signal 201 of the equalizer. The input signal 201 of the equalizer is an electrical signal having an analog value and is an object of decoding operation. This signal 201 has an actual value having a difference from an idealistic reference level. The input signal 201 of the channel identifier is input to the level selector 350 through delay units 311, 312, . . . The number of delay units is the same as the number (M) of memories of the viterbi decoder. The level selector 350 transfers the input signal 201 of the channel identifier 170 to a mean filter 340 corresponding to each level, based on the selection signal 331. Each of the mean filters 340 corresponds to respective levels of the viterbi decoder. Accordingly, the number of mean filters 340 is the same as the number of levels of the connected viterbi decoder. Also, unnecessary paths can be removed.

Each mean filter 340 obtains a mean value of selected signals 341, 342, 343, . . . , for a predetermined time, and outputs the mean value as a new level value 351, 352, 353, . . . Generally, a low pass filter can be used as the mean value filter 340. At this time, the characteristic of the low pass filter estimating a DC mean value is used. Another form of the mean filter 340 is to use the following equation 1:

$$L' = L + (I - L)/C \tag{1}$$

Here, L' denotes a new level value 351, 352, . . . , which is updated by a newly input signal, L denotes a previous level value, I denotes a delayed input signal 351, 352, . . . , and C denotes a constant. The more the value of constant C is increased, the less the change in the degree of level L' to be updated, and the decrease in the degree of level follow-up.

In FIGS. 2A and 2B, the detected new level value 351, 352, . . . , is input to the adaptation processor 180. The adaptation processor 180 generates a new coefficient 208 of the equalizer based on the detected level error. The detected level error is the difference of the output signal 205 of the equalizer and the detected new level value. To obtain a new coefficient 208 of the equalizer, a method updating a previous coefficient by using a least mean square (LMS) method is used. For example, an equation which can be used is as the following equation 2:

$$W_{K+1} = W_k + 2\mu e_k X_k \qquad (2)$$

Here, $W_{K+1}$ denotes the new coefficient 208 of the equalizer, $W_k$ denotes the previous coefficient of the equalizer, $\mu$ denotes a follow-up speed (real number), $e_k$ denotes an error signal and is a value obtained by subtracting the output signal 205 of the equalizer from the detected level value, and $X_k$ denotes the input signal 204 of the equalizer.

As shown in FIG. 2A, the input signal $X_k$ 204 is delayed by the delay unit 190 and then input to the adaptation processor 180. This is because the adaptation processor 180 needs predetermined clocks of delay to obtain the level error $e_k$. Similarly, the output signal 205 of the equalizer 130 is delayed for a predetermined time and then input to the adaptation processor 180. This is because there is a time delay for the adaptation processor 180 to detect a new level.

The follow-up speed $\mu$ is a parameter determining the degree of follow-up and can be adjusted by a microcomputer or other control tools. The higher the value of follow-up speed $\mu$ is, the more the degree of level follow-up increases. This should occur within a range of stability, so if the value is not within the range, it diverges and becomes unstable. By readjusting the coefficient of the equalizer, that is, the filter, by using an analyzed optimum level, the adaptation processor removes only noise such that the output signal of the equalizer can keep almost all the frequency characteristic of the original channel. This provides higher stability for the stabilization of LMS algorithm coefficients and divergence that have been problematic.

However, in the FIGS. 2A and 2B, when an input signal is not input or an input signal is very weak due to some reason, the level value output from the channel identifier becomes unreasonably small, even when the input signal returns to a normal state, and the viterbi decoder operates with a level value output a predetermined time before. This causes the error rate of the output of the viterbi decoder to increase. In addition, since this output signal of the viterbi decoder in turn affects the determination of a level value of the channel identifier, this erroneous cycle takes place repeatedly.

Figure 3:
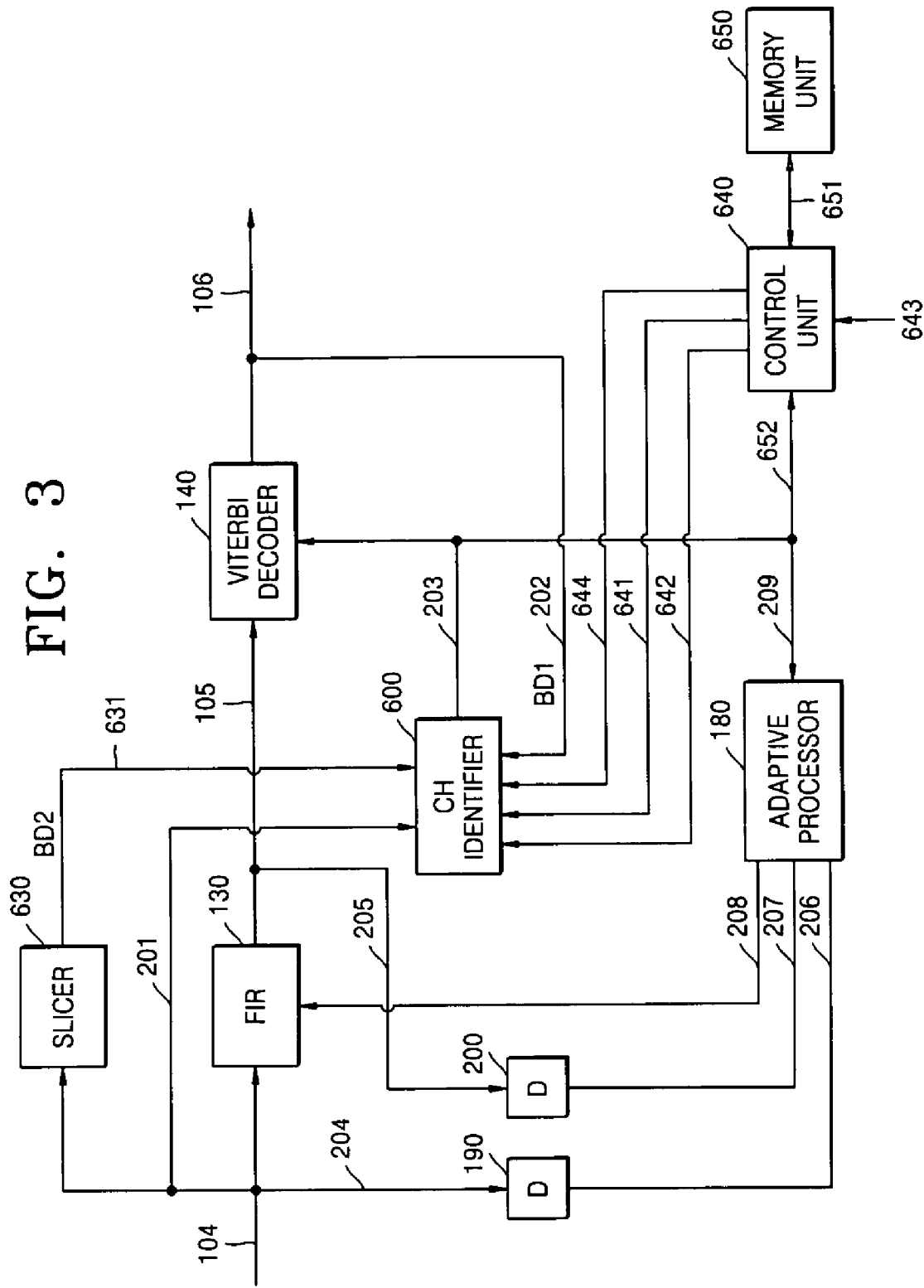
FIG. 3 is a block diagram of a data reproduction apparatus according to an embodiment of the present invention.

FIG. 3 is a block diagram of a data reproduction apparatus according to an embodiment of the present invention.

The analog-to-digital converter 110 and the DC offset cancellation unit 120 not shown in FIG. 3 are the same as those corresponding parts shown in FIG. 2A. 1 and the input signal 104 of the equalizer 130 will be explained first.

Unlike the data reproduction device of FIGS. 2A and 2B, the present invention further includes a slicer 630, a control unit 640, and a memory unit 650. In addition, the channel identifier 600 has a different internal structure from that of the channel identifier of FIG. 2A.

The slicer 630 outputs a binary signal (a second binary signal) 631 from an input RF signal 104. This binary signal 631 is distinguished from the output signal 106 (a first binary signal) of the viterbi decoder in that the binary signal 631 does not pass through viterbi decoding.

The slicer 630 determines whether a signal sampled for a predetermined period from the received RF signal 111 has a (+) value or a (−) value. If it has a (+) value, signal 1 is output and if it has a (−) value, signal 0 is output. Generally, using the output signal 631 of a slicer as an input signal of a channel identifier has a higher error ratio than that of using the output signal 202 of a viterbi decoder. However, according to an aspect of the present invention, when the output signal of the viterbi decoder is abnormal, the binary signal 631 directly extracted from the input RF signal 104 is much more similar to its original binary value. Accordingly, when determined by a user or an additional circuit that the output signal of the viterbi decoder is abnormal, it is preferable to use the output signal 631 of the slicer as the input signal of the channel identifier.

Therefore, in the data reproduction device according to the present invention, the slicer 630 and the viterbi decoder 140 are selectively used as a binarization unit.

Based on a user input 643, the control unit 640 generates a binarization unit selection signal 644 and a reset signal 642 that determine an operation mode of the channel identifier 600. The operation mode of the channel identifier 600 is determined by the following factors.

The first factor is the type of an input binary signal required for the channel identifier 600 to generate a reference level value to be input to the viterbi decoder.

Selection of this type is achieved by a binarization unit selection signal 644. The control unit 640 which receives a user input 643 outputs the binarization unit selection signal 644, and the channel identifier 600 which receives the binarization unit selection signal 644 uses the output signal 106 (202) of the viterbi decoder and the output signal 631 of the slicer as an input signal, according to the received binarization unit selection signal 644.

The second factor is the type of a signal to be used as the level value of the viterbi decoder. The control unit 640 outputs a reset signal 642 according to the user input 643. The channel identifier 600, which receives the reset signal 642, determines whether a value generated based on the binary signal 631 or 202 generated by the binarization unit 630 or the viterbi decoder 140 is used or a predetermined initial level value is used as a level value of the viterbi decoder. The user input 643 may be an input signal by a user operation or an abnormal state signal. The abnormal state signal is a signal which is generated based on a state of the output signal 106 of the viterbi decoder and according to a predetermined condition, determines whether the output signal of the viterbi decoder is in a normal state or in an abnormal state. Here, the predetermined condition can be set in a variety of types, and in embodiments of the present invention, it can be set by any one of the following three methods.

The first method is performed by determining whether or not a synchronization signal included in the output signal 106 of the viterbi decoder is periodically detected. If it is determined that the interval of detected sync signals is not periodical, an abnormal state signal is generated. The second method is a defect detection method in which by determining the size or shape of the output signal itself of the viterbi decoder, the presence of defects is checked. For example, the envelope signal of the output signal of the viterbi decoder is extracted and if the amplitude of this envelope signal is less than a predetermined threshold value, an abnormal state is determined. The third method is a size checking method in which when the size of a waveform, obtained by subtracting a minimum value of a detected level value from a maximum value, is less than a predetermined threshold, an abnormal state is checked. In this method, only with a detected level value, it is determined whether or not the state is abnormal.

The method to determine whether or not a binary signal is abnormal is well known in the field of the art.

In a normal state, the control unit 640 receives a level value 652 detected by the channel identifier 600 and stores the value in the memory unit 650. If an abnormal state signal is input as the user input 643, the control unit 640 transmits the reset signal 642 and an initialization level value 641 to the channel identifier 600. Here, the initialization level value 641 is a level value detected by the channel identifier in a normal state, or a predetermined value arbitrarily input by the user.

Figure 4:
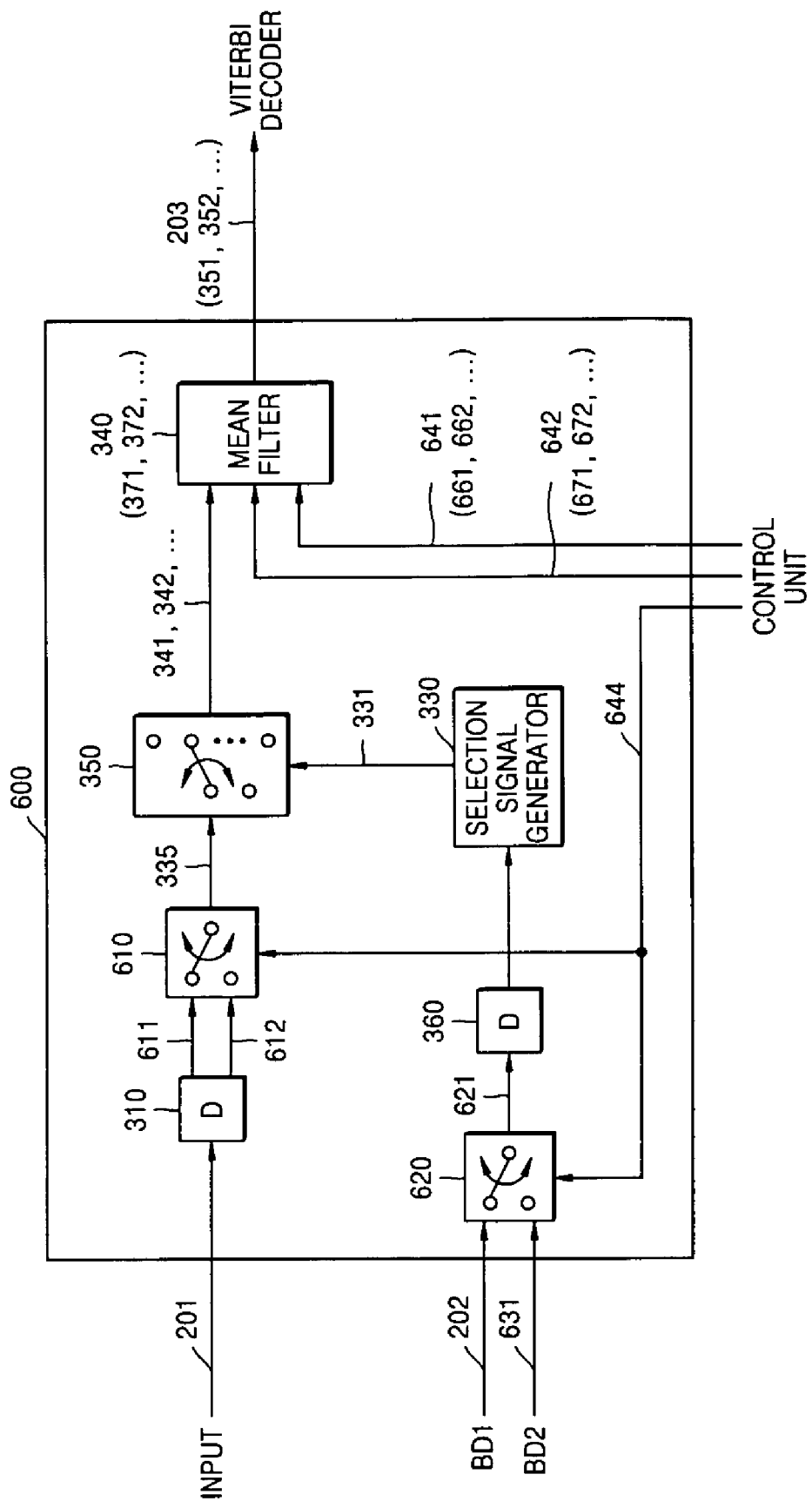
FIG. 4 is a diagram showing the internal structure of a channel identifier according to another embodiment of the present invention.

FIG. 4 is a diagram showing the internal structure of a channel identifier according to an embodiment of the present invention.

Unlike the channel identifier 170 shown in FIG. 2B, the channel identifier 600 according to the present invention further includes a first selection unit 620 and a second selection unit 610 in addition to delays 310 and 360, a selection signal generator 330, a level selector 350, and a mean filter 340.

Based on the binarization unit selection signal 644 received from the control unit 640, the first selection unit 620 determines a binary signal to be input to the selection signal generator 330. For example, if the binarization unit selection signal is 0, the output signal 202 of the viterbi decoder 140 is used as an input signal of the selection signal generator 330, and if the binarization unit selection signal is 1, the output signal 631 of the slicer 630 is used as an input signal of the selection signal generator 330. The delay 360 used during the operation period of the viterbi decoder is the same as the delay 360 used in the channel identifier of FIG. 2B.

Based on the binarization unit selection signal 644 received from the control unit 640, the second selection unit 610 selects the type of an input RF signal 201 to be input to the level selector 350. The determination of the type of input RF signal is based on how long the input RF signal 201 used to determine the level value 351 of the viterbi decoder will be delayed. For example, when the binarization unit selection signal 644 is 0 and therefore the output signal 202 of the viterbi decoder is used as an input signal of the selection signal generator 330, the input RF signal 201 should be input to the mean filter 371, 372, . . . , after being delayed by the same number of clocks as the number of taps of the viterbi decoder. However, if the binarization unit selection signal 644 is selected as 1 and the output signal of the slicer 630 is used as an input signal of the selection signal generator 330, the input RF signal 201 should be input to the mean filter 371, 372, . . . , after being delayed by the operation period of the slicer 630. Since the operation period of the slicer 630 is generally shorter than the delay time by the number of taps of the viterbi decoder, the number of delays 310 is less when the binarization unit selection signal 644 is 1 than when the binarization unit selection signal 644 is 0.

The operation of the level selector 350 is the same as in FIG. 2B, and based on the selection signal 331, the level type of an input RF signal 335 to be input to the mean filter is selected.

The mean filter (340) 371, 372, . . . operates in a different mode according to the reset signal 642 received from the control unit. If the reset signal 642 is 0, the mean filter 340 sequentially stores the values of the input RF signals 341, obtains the mean value 203 of them, and then transmits the mean value, as a detected level value, to the viterbi decoder in the same manner as that of the mean filter of FIG. 2B. If the reset signal is 1, the mean filter 340 receives an initialization level value 641 from the control unit 640, and transmits this initialization level value without change as a detected level value, to the viterbi decoder. In FIG. 4, the input RF signals 341, 342, . . . , the mean filter 371, 372, the initialization level values 661, 662, . . . , reset signals 671, 672, . . . , and the level values 351, 352, . . . , of the viterbi decoder correspond to respective level types.

Figure 5:
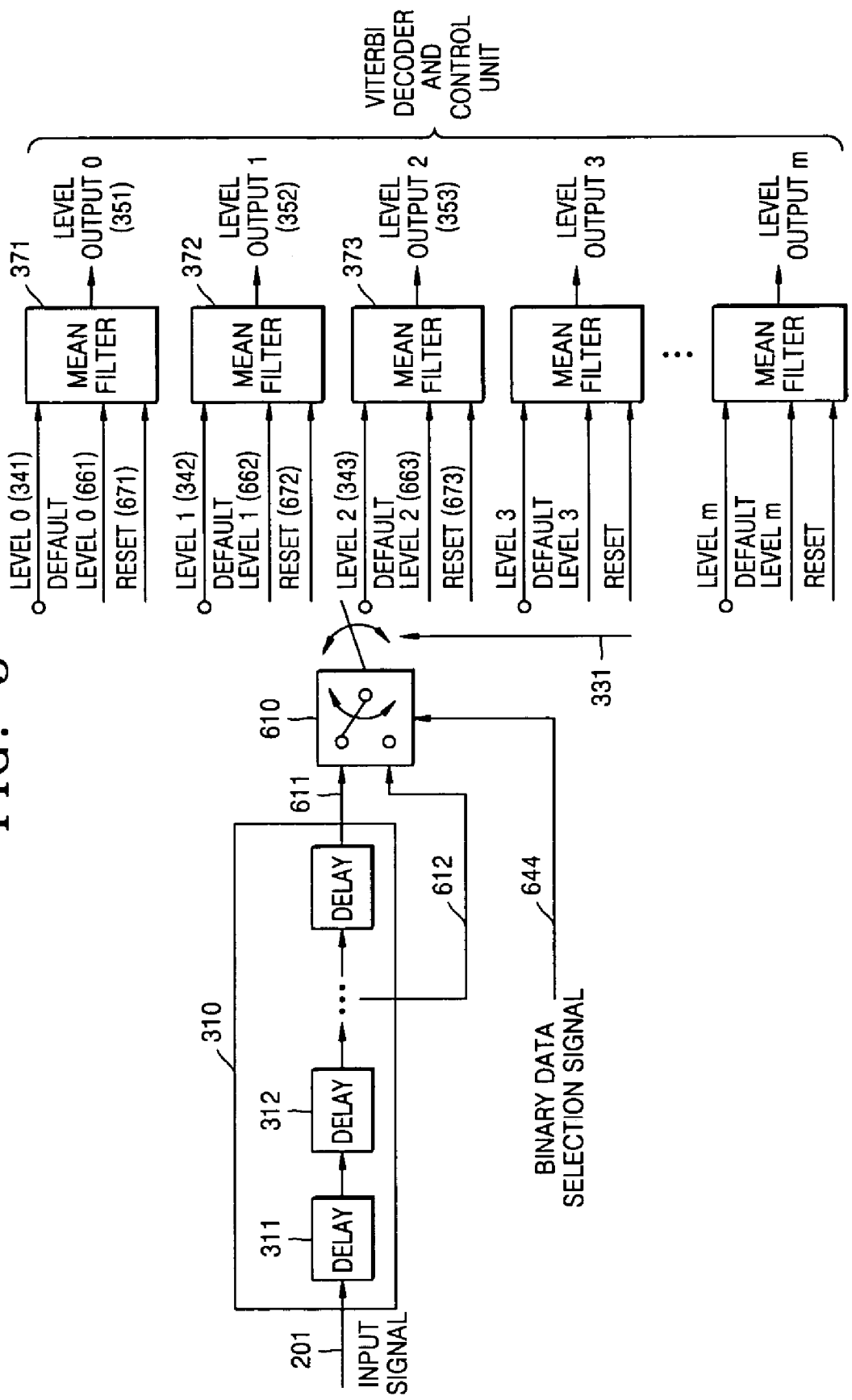
FIG. 5 is a detailed diagram of the internal structure of a channel identifier according to each level type.

FIG. 5 is a more detailed diagram of the internal structure of this channel identifier 600 according to these level types.

Figure 6:
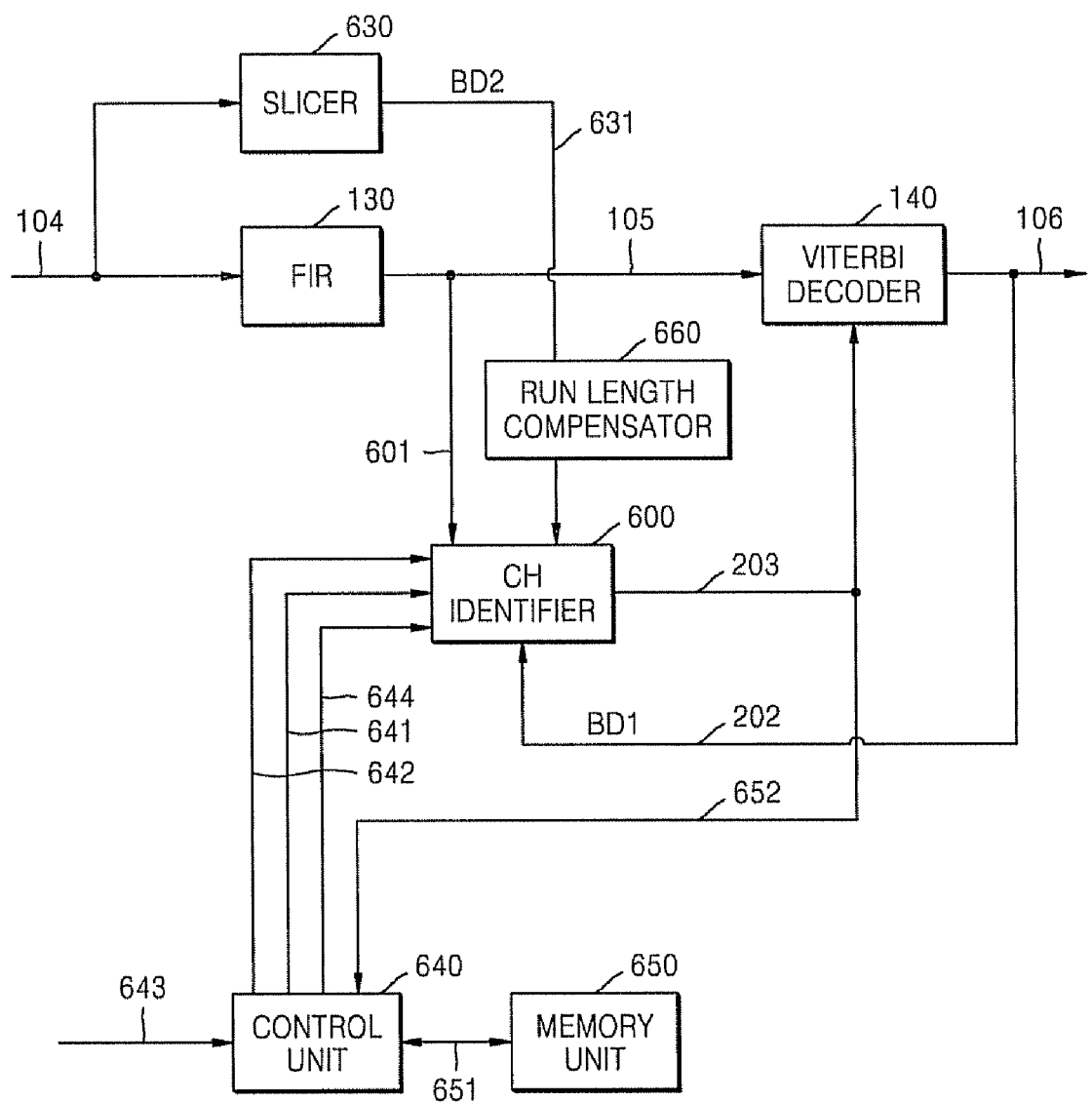
FIG. 6 is a block diagram of a data reproduction apparatus according to another embodiment of the present invention.

FIG. 6 is a block diagram of a data reproduction apparatus according to another embodiment of the present invention.

Referring to FIG. 6, the adaptation processor 180 and the delays 190 and 200 are removed, and the output signal 601 of the equalizer 130 instead of the input RF signal 201 is used as an input signal of the channel identifier 600, which are different from the data reproduction device of FIG. 3. The structures and functions of the channel identifier 600, the control unit 640, and the memory unit 650 are the same as those of the data reproduction device of FIG. 3.

The reason why the output signal 601 of the equalizer 130 is used as an input signal of the channel identifier 600, instead of the input RF signal 201, is that when the coefficients of the equalizer 130 are not updated by using the adaptation processor 209, using the output signal of the equalizer decreases the error ratio. Thus, even when the adaptation processor 180 is not used, the present invention can be applied. This is because the presence or absence of the adaptation processor 180 does not affect the internal structure of the channel identifier 600. A binary signal input to the channel identifier 600 can be selected between the output signal 106 of the viterbi decoder and the output signal 631 of the slicer, and also, in an abnormal state, the initialization level value stored in the memory unit 650 can be used as the level value of the viterbi decoder. Accordingly, a decrease in the error ratio in an abnormal state, can be achieved.

According to another embodiment of the present invention, in order to obtain a binary signal 631 having a less error ratio, a run length compensator 660 can be arranged between the slicer 630 and the channel identifier 600. The run length compensator 660 is a circuit to correct the sign (+/−) of a signal that is falsely determined by the slicer 630 due to external factors. When the output signal 631 of the slicer 630 contains a signal of shortest T that should not be contained, the run length compensator works. The run length compensator 660 compares the signal level value of the cycle in which a shortest T signal is detected, with the signal level value of the cycle immediately before or immediately after the shortest T signal cycle, and checks the difference. Then, the binary value corresponding to the level value of a signal having a greater value between the two values is converted into an opposite value and then output. The run length compensator 660 is well known to those skilled in the art. 660 is well known to those skilled in the art.

According to the present invention as described above, even when an input signal is in an abnormal state, an input level value can be initialized so that a viterbi decoder can normally operate.

The present invention can also be used in a data reproduction apparatus using a viterbi decoder as described above.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus detecting a level value of a Viterbi decoder, comprising:
the Viterbi decoder which generates a first binary signal;
a binarization unit which generates a second binary signal from an input RF signal; and
a channel identifier which detects a new level value of the Viterbi decoder based on the input RF signal and the first and second binary signals,
wherein the channel identifier selects a level of the input RF signal based on the binary signals and detects the new level value by obtaining a mean value of the input RF signal of the selected level and a previous level value,
wherein the binarization unit is a slicer, and comprises a run length compensator correcting a sign of the second binary signal generated by the binarization unit, and
wherein the channel identifier comprises:
a selection signal generator which generates a selection signal based on the binary signals;
a level selector which selects the level of the input RF signal according to the selection signal and outputs the selected level; and
a mean filter which generates the new level value based on the previous level value and the input RF signal of the selected level, and
the selection signal generator generates a selection signal by multiplexing a signal obtained by delaying the output signal of the Viterbi decoder by a same number of clock signals as a number of taps of the Viterbi decoder.

2. A data reproduction device comprising:
a Viterbi decoder which generates a first binary signal from an input RF signal;
a binarization unit which generates a second binary signal from the input RF signal; and
a channel identifier which selects a level of the input RF signal by selectively using the first and second binary signals and by obtaining a mean value of the input RF signal of the selected level and a previous reference level value, detects a new reference level value of the Viterbi decoder,
wherein the binarization unit is a slicer and has a run length compensator correcting a sign of the second binary signal generated by the binarization unit, and
wherein the channel identifier comprises:
a selection signal generator which generates a selection signal based on the binary signals;
a level selector which selects a level of the input RF signal according to the selection signal and outputs the selected level;
a mean filter which generates the new reference level value based on the previous level value and the selected level;
a first selector which based on a binarization unit selection signal from a control unit, selects one of the first binary signal or the second binary signal, and provides a selected binary signal to the selection signal generator; and
a second selector which based on the binarization unit selection signal, selects one of a signal obtained by delaying the input RF signal m times and a signal obtained by delaying the input RF signal n times, and provides a selected RF signal to the level selector, wherein m denotes a delay time by the operation of the Viterbi decoder, and n denotes the delay time by the operation of the slicer.

3. The data reproduction device of claim 2, wherein the selection signal generator generates a selection signal by multiplexing a signal obtained by delaying the output signal of the Viterbi decoder by a same number of clock signals as a number of taps of the Viterbi decoder.

4. The data reproduction device of claim 2, wherein the mean filter detects the new reference level value according to the following equation:

new reference level value=previous level value+(delayed input signal−previous level value)/constant.

5. A data reproduction device having a Viterbi decoder, comprising:
a binarization unit which generates a binary signal from an input RF signal;
a channel identifier which detects a reference level value of the Viterbi decoder based on the input RF signal and the binary signal;
a control unit which receives an abnormal state signal and transmits a predetermined initialization level value to the channel identifier; and
a memory unit which stores the initialization level value,
wherein when the abnormal state signal is received, the channel identifier detects the predetermined initialization level value as the reference level value of the Viterbi decoder, and
wherein the predetermined initialization level value is a reference level value which, when the output binary signal of the Viterbi decoder is a normal signal, is generated by the channel identifier and stored in the memory unit,
and wherein the channel identifier comprises:
a selection signal generator which generates a selection signal based on the binary signal;
a level selector which selects the level of the input RF signal according to the selection signal and outputs the selected level;
and a mean filter which generates the new level value based on the previous level value and the input RF signal of the selected level, and
the selection signal generator generates a selection signal by multiplexing a signal obtained by delaying the output signal of the Viterbi decoder by a same number of clock signals as a number of taps of the Viterbi decoder.

6. The data reproduction device of claim 5, wherein the predetermined initialization level value is a reference level value which is detected based on a binary signal from a binarization unit that is not a Viterbi decoder.

7. The data reproduction device of claim 6, wherein if the abnormal state signal is inactivated, the channel identifier generates a reference level value based on an output binary signal of the Viterbi decoder.

8. A data reproduction device having a Viterbi decoder, comprising:
a binarization unit which generates a binary signal from an input RF signal;
a channel identifier which detects a reference level value of the Viterbi decoder based on the input RF signal and the binary signal; and
a control unit which receives an abnormal state signal and transmits a predetermined initialization level value to the channel identifier,
wherein when the abnormal state signal is received, the channel identifier detects the predetermined initialization level value as the reference level value of the Viterbi decoder, and wherein the channel identifier comprises:
  a selection signal generator which generates a selection signal based on the binary signal:
  a level selector which selects a level of the input RF signal according to the selection signal; and
  a mean filter which generates the reference level value based on a previous level value and the selected level of the input signal;
  a first selector which based on a binarization unit selection signal from a control unit, selects one of an output binary signal of the Viterbi decoder and an output binary signal of the slicer, and provides the selected signal to the selection signal generator; and
  a second selector which based on the binarization unit selection signal, selects one of a signal obtained by delaying the input RF signal m times and a signal obtained by delaying the input RF signal n times, and provides the selected signal to the level selector, wherein m denotes a delay time by the operation of the Viterbi decoder, and n denotes the delay time by the operation of the slicer.

9. The data reproduction device of claim of 8, wherein the binarization unit selection signal is generated by the control unit when a user input or the abnormal state signal is received.

10. The data reproduction device of claim 9, wherein if a reset signal from the control unit is received, the mean filter receives the predetermined initialization level value from the control unit and outputs the predetermined initialization level value as the reference level value, and the reset signal is generated by the control unit when the control unit receives the abnormal state signal.

11. A data reproduction device having a Viterbi decoder, comprising:
  a binarization unit which generates a binary signal from an input RF signal;
  a channel identifier which detects a reference level value of the Viterbi decoder based on the input RF signal and the binary signal;
  a control unit which receives an abnormal state signal and transmits a predetermined initialization level value to the channel identifier; and
  a memory unit which stores the initialization level value,
  wherein when the abnormal state signal is received, the channel identifier detects the predetermined initialization level value as the reference level value of the Viterbi decoder, and the abnormal signal is a signal which is generated when a synchronization signal contained in recorded data is not detected periodically,
  and wherein the channel identifier comprises:
  a selection signal generator which generates a selection signal based on the binary signal;
  a level selector which selects the level of the input RF signal according to the selection signal and outputs the selected level;
  and a mean filter which generates the new level value based on the previous level value and the input RF signal of the selected level, and
  the selection signal generator generates a selection signal by multiplexing a signal obtained by delaying the output signal of the Viterbi decoder by a same number of clock signals as a number of taps of the Viterbi decoder.

12. A data reproduction device having a Viterbi decoder, comprising:
  a binarization unit which generates a binary signal from an input RF signal;
  a channel identifier which detects a reference level value of the Viterbi decoder based on the input RF signal and the binary signal;
  a control unit which receives an abnormal state signal and transmits a predetermined initialization level value to the channel identifier; and
  a memory unit which stores the initialization level value,
  wherein when the abnormal state signal is received, the channel identifier detects the predetermined initialization level value as the reference level value of the Viterbi decoder, and the abnormal state signal is a signal which is generated by a defect detection method checking defects of an envelope signal waveform of the input RF signal itself,
  and wherein the channel identifier comprises:
  a selection signal generator which generates a selection signal based on the binary signal;
  a level selector which selects the level of the input RF signal according to the selection signal and outputs the selected level;
  and a mean filter which generates the new level value based on the previous level value and the input RF signal of the selected level, and
  the selection signal generator generates a selection signal by multiplexing a signal obtained by delaying the output signal of the Viterbi decoder by a same number of clock signals as a number of taps of the Viterbi decoder.

13. A data reproduction device having a Viterbi decoder, comprising:
  a binarization unit which generates a binary signal from an input RF signal;
  a channel identifier which detects a reference level value of the Viterbi decoder based on the input RF signal and the binary signal;
  a control unit which receives an abnormal state signal and transmits a predetermined initialization level value to the channel identifier; and
  a memory unit which stores the initialization level value,
  wherein when the abnormal state signal is received, the channel identifier detects the predetermined initialization level value as the reference level value of the Viterbi decoder,
  the abnormal state signal is a signal which is generated by a size checking method checking whether or not the size of a waveform obtained by subtracting a minimum value from a maximum value in reference level values detected by the channel identifier, is equal to or less than a predetermined threshold value,
  and wherein the channel identifier comprises:
  a selection signal generator which generates a selection signal based on the binary signal;
  a level selector which selects the level of the input RF signal according to the selection signal and outputs the selected level;
  and a mean filter which generates the new level value based on the previous level value and the input RF signal of the selected level, and
  the selection signal generator generates a selection signal by multiplexing a signal obtained by delaying the output signal of the Viterbi decoder by a same number of clock signals as a number of taps of the Viterbi decoder.

14. A data reproduction method using a Viterbi decoder, comprising:
  generating a binary signal from an input RF signal;
  detecting a reference level value of the Viterbi decoder based on the input RF signal and the binary signal in identifying a channel; and detecting a predetermined initialization level value as the reference level value in identifying the channel when receiving an abnormal state signal, wherein the detecting the predetermined initialization level value comprises:
receiving the predetermined initialization level value from a control unit when receiving the abnormal state signal, and wherein the identifying the channel comprises:
generating a selection signal based on the binary signal;
selecting a level of the input RF signal according to the selection signal; and
generating the reference level value based on a previous reference level value and the input RF signal of the selected level, and
wherein the predetermined initialization level value is the reference level value which, when an output binary signal of the Viterbi decoder is a normal signal, is generated by the channel identifier and stored in a memory unit.

15. The data reproduction method of claim 14, wherein the predetermined initialization level value is a reference level value which is detected based on a binary signal from a binarization unit that is not a Viterbi decoder.

16. The data reproduction method of claim 15, wherein in the identifying a channel, if the abnormal state signal is inactivated, the reference level value is generated based on an output binary signal of the Viterbi decoder.

17. A data reproduction method using a Viterbi decoder, comprising:
generating a binary signal from an input RF signal;
detecting a reference level value of the Viterbi decoder based on the input RF signal and the binary signal in identifying a channel; and
detecting a predetermined initialization level value as reference level value in identifying the channel when receiving an abnormal state signal,
wherein the detecting the predetermined initialization level value comprises:
receiving the predetermined initialization level value from a control unit when receiving the abnormal state signal, and
wherein the identifying the channel comprises:
generating a selection signal based on the binary signal;
selecting a level of the input RF signal according to the selection signal;
generating the reference level value based on a previous level value and the input RF signal of the selected level; and
based on a binarization unit selection signal, selecting any one of an output binary signal of the Viterbi decoder and an output binary signal of a slicer in a first selection; and selecting one of a signal obtained by delaying the input RF signal m times and a signal obtained by delaying the input RF signal n times in a second selection, wherein m denotes a delay time by the operation of the Viterbi decoder, and n denotes the delay time by the operation of the slicer.

18. The data reproduction method of claim 17, wherein the generating the reference level value comprises:
if a reset signal from the control unit is received, receiving the predetermined initialization level value from the control unit and outputting the predetermined initialization level value as the reference level value, and the reset signal is generated by the control unit when the control unit receives the abnormal state signal.

19. A data reproduction method using a Viterbi decoder, comprising:
generating a binary signal from an input RF signal;
detecting a reference level value of the Viterbi decoder based on the input RF signal and the binary signal in identifying a channel; and
detecting a predetermined initialization level value as reference level value in identifying the channel when receiving an abnormal state signal,
wherein the detecting the predetermined initialization level value comprises:
receiving the predetermined initialization level value from a control unit when receiving the abnormal state signal, and
wherein the abnormal signal is a signal which is generated when a synchronization signal contained in recorded data is not detected periodically,
and wherein the identifying the channel comprises:
generating a selection signal based on the binary signal;
selecting a level of the input RF signal according to the selection signal; and
generating the reference level value based on a previous level value and the input RF signal of the selected level.

20. A data reproduction method using a Viterbi decoder, comprising:
generating a binary signal from an input RF signal;
detecting a reference level value of the Viterbi decoder based on the input RF signal and the binary signal in identifying a channel; and
detecting a predetermined initialization level value as reference level value in identifying the channel when receiving an abnormal state signal,
wherein the detecting the predetermined initialization level value comprises:
receiving the predetermined initialization level value from a control unit when receiving the abnormal state signal, and
wherein the abnormal state signal is a signal which is generated by a defect detection method for checking defection of an envelope signal waveform of the input RF signal itself,
and wherein the identifying the channel comprises:
generating a selection signal based on the binary signal;
selecting a level of the input RF signal according to the selection signal; and
generating the reference level value based on a previous level value and the input RF signal of the selected level.

21. A data reproduction method using a Viterbi decoder, comprising:
generating a binary signal from an input RF signal;
detecting a reference level value of the Viterbi decoder based on the input RF signal and the binary signal in identifying a channel; and
detecting a predetermined initialization level value as reference level value in identifying the channel when receiving an abnormal state signal,
wherein the detecting the predetermined initialization level value comprises:
receiving the predetermined initialization level value from a control unit when receiving the abnormal state signal, and
wherein the abnormal state signal is a signal which is generated by a size checking method for checking whether or not the size of a waveform obtained by subtracting a minimum value from a maximum value in reference level values detected by the channel identifier, is equal to or less than a predetermined threshold value, and wherein the identifying the channel comprises:
generating a selection signal based on the binary signal;
selecting a level of the input RF signal according to the selection signal; and
generating the reference level value based on a previous level value and the input RF signal of the selected level.

22. A data reproduction device having a Viterbi decoder, comprising:
a binarization unit which generates a binary signal from an input RF signal;
a channel identifier which detects a reference level value of the Viterbi decoder based on the input RF signal and the binary signal; and
a control unit which receives an abnormal state signal and transmits a predetermined initialization level value to the channel identifier,
wherein when the abnormal state signal is received, the channel identifier detects the predetermined initialization level value as the reference level value of the Viterbi decoder, and
the predetermined initialization level value is the reference level value detected by the channel identifier in a normal state, or a predetermined value input by user,
and wherein the channel identifier comprises:
a selection signal generator which generates a selection signal based on the binary signals;
a level selector which selects the level of the input RF signal according to the selection signal and outputs the selected level;
and a mean filter which generates the new level value based on the previous level value and the input RF signal of the selected level, and
the selection signal generator generates a selection signal by multiplexing a signal obtained by delaying the output signal of the Viterbi decoder by a same number of clock signals as a number of taps of the Viterbi decoder.

23. A data reproduction method using a Viterbi decoder, comprising:
generating a binary signal from an input RF signal:
detecting a reference level value of the Viterbi decoder based on the input RF signal and the binary signal in identifying a channel; and
detecting a predetermined initialization level value as reference level value in identifying the channel when receiving an abnormal state signal,
wherein the detecting the predetermined initialization level value comprises:
receiving the predetermined initialization level value from a control unit when receiving the abnormal state signal, the predetermined initialization level value being the reference level detected in a normal state, or a predetermined value input by a user,
and wherein the identifying the channel comprises:
generating a selection signal based on the binary signal;
selecting a level of the input RF signal according to the selection signal; and
generating the reference level value based on a previous level value and the input RF signal of the selected level.

24. A data reproduction device having a Viterbi decoder, comprising:
a binarization unit which generates a binary signal from an input RF signal;
a channel identifier which detects a reference level value of the Viterbi decoder based on the input RF signal and the binary signal; and
a control unit which receives an abnormal state signal and transmits a predetermined initialization level value to the channel identifier,
wherein when the abnormal state signal is received, the channel identifier detects the predetermined initialization level value as the reference level value of the Viterbi decoder, and
the predetermined initialization level value is stored in a memory unit of the data reproduction device,
and wherein the channel identifier comprises:
a selection signal generator which generates a selection signal based on the binary signal;
a level selector which selects the level of the input RF signal according to the selection signal and outputs the selected level;
and a mean filter which generates the new level value based on the previous level value and the input RF signal of the selected level, and
the selection signal generator generates a selection signal by multiplexing a signal obtained by delaying the output signal of the Viterbi decoder by a same number of clock signals as a number of taps of the Viterbi decoder.

* * * * *